(No Model.) 2 Sheets—Sheet 1.
F. M. ANDERSON.
FRUIT PEELING TABLE.
No. 517,511. Patented Apr. 3, 1894.
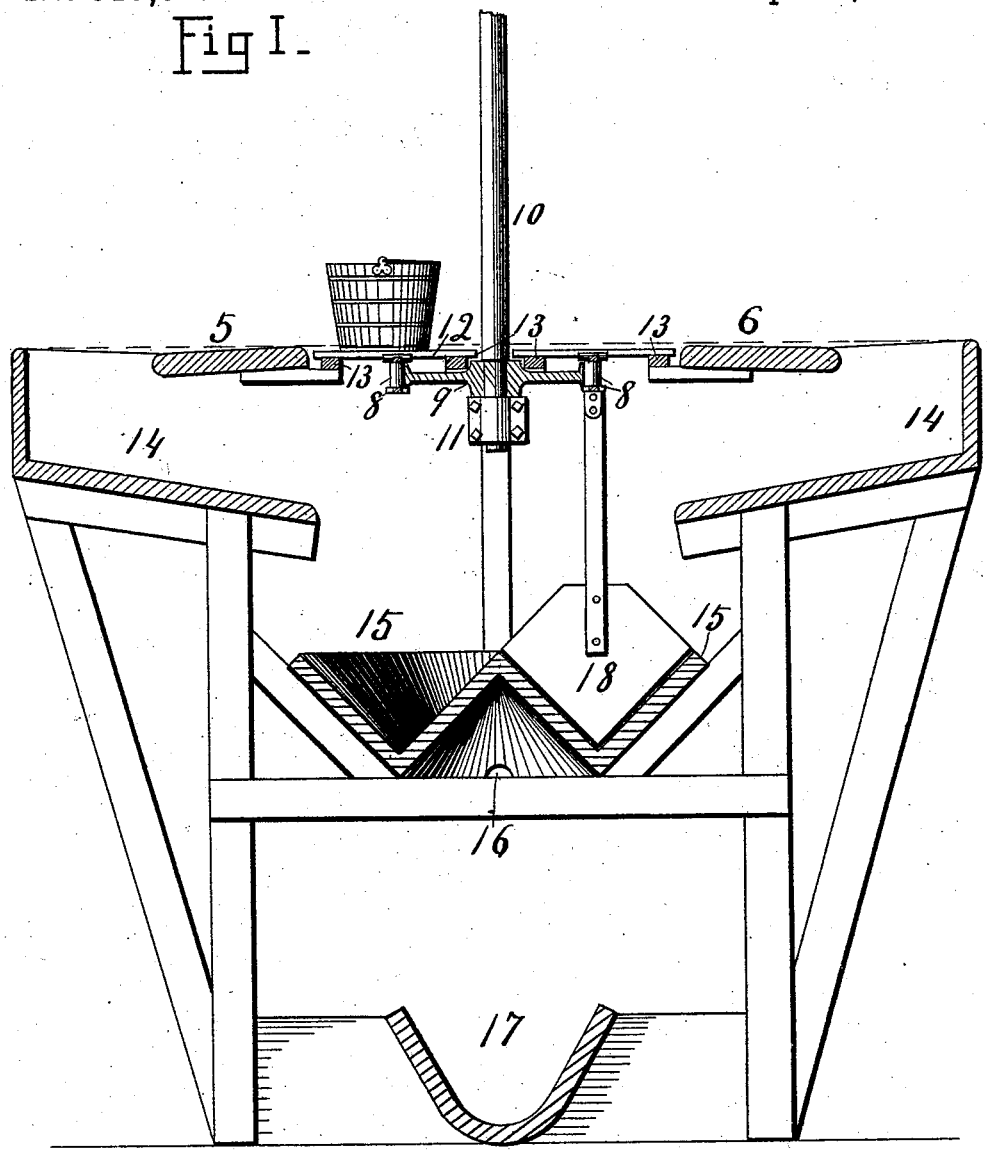
Fig I.
Witnesses,
P. E. Stevens.
M. C. Hillyard.
Inventor.
Frank M. Anderson.
by W. X. Stevens Atty.

(No Model.) 2 Sheets—Sheet 2.
F. M. ANDERSON.
FRUIT PEELING TABLE.
No. 517,511. Patented Apr. 3, 1894.
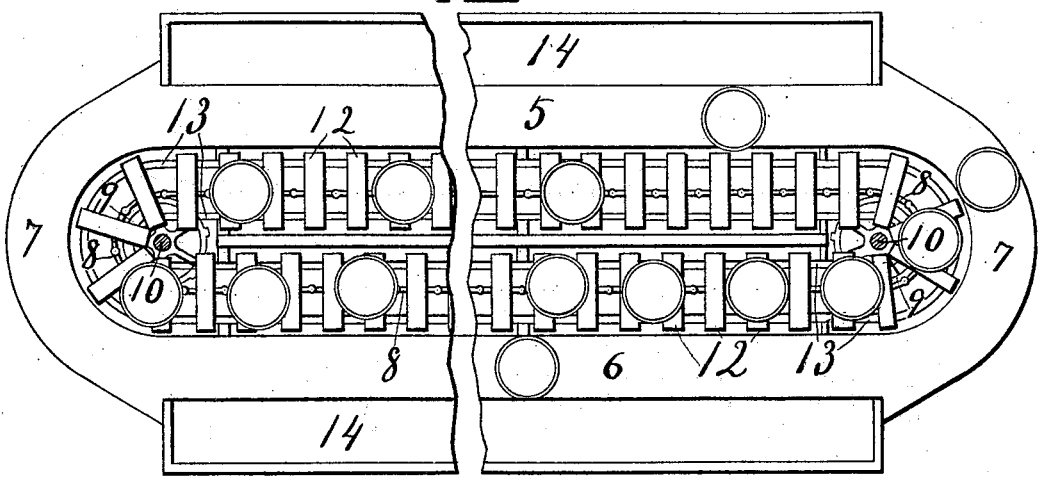
Fig II.
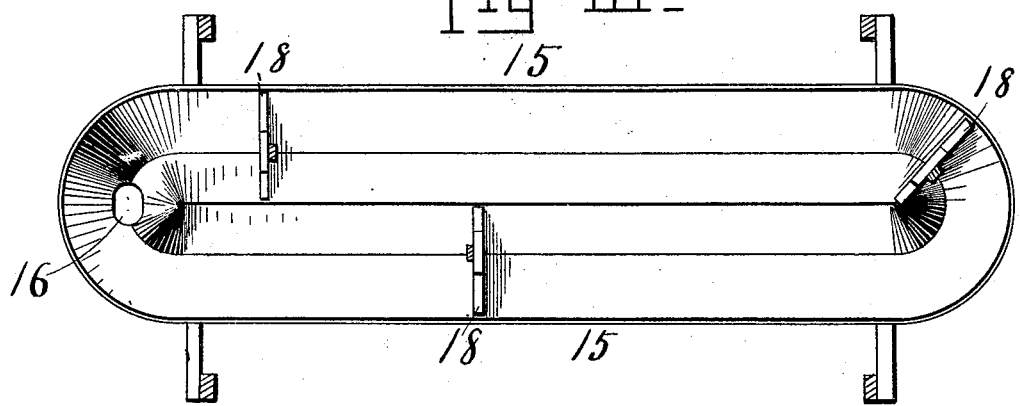
Fig III.
WITNESSES,
P. E. Stevens.
M. C. Hillyard.
INVENTOR.
Frank M. Anderson.
by W. L. Stevens. ATTY.
THE NATIONAL LITHOGRAPHING COMPANY,
WASHINGTON, D. C.

UNITED STATES PATENT OFFICE.

FRANK M. ANDERSON, OF KEOKUK, IOWA.

FRUIT-PEELING TABLE.

SPECIFICATION forming part of Letters Patent No. 517,511, dated April 3, 1894.

Application filed October 7, 1893. Serial No. 487,450. (No model.)

*To all whom it may concern:*

Be it known that I, FRANK M. ANDERSON, a citizen of the United States, residing at Keokuk, in the county of Lee and State of Iowa, have invented certain new and useful Improvements in Fruit-Peeling Tables; and I do hereby declare the following to be a full, clear, and exact description of the invention, such as will enable others skilled in the art to which it appertains to make and use the same.

This invention relates to tables used in large establishments for peeling fruit preparatory to canning it. It may be here stated that absolute cleanliness throughout every part of a fruit canning establishment is a positive requisite to success in business. If the slightest bit of peeling or core, or any other part of the fruit is left uncared for it quickly becomes sour, and if that comes in contact with any fruit to be canned or even if it pollutes the air in which the canning takes place, fruits so canned are likely to become sour and worthless. So that every facility should be provided which can be had for rapidly cleaning and preparing the fruit for canning, also for cleaning up the establishment.

To this end my invention consists in the construction and combination of parts forming a "fruit-peeling table" hereinafter described and claimed, reference being had to the accompanying drawings, in which—

Figure I, is a transverse vertical section of a fruit-peeling table according to my invention. Fig. II, is a plan or top view of the same on a smaller scale, and Fig. III, is a plan or top view of the gathering trough showing the adjacent parts in horizontal section.

5 and 6 represent boards extending nearly the whole length of the table and forming the top thereof, upon which the work of peeling fruit is done.

The kind of fruit which I shall particularly consider in this specification as being prepared for canning is tomatoes.

7 represents semicircular end boards of the table top.

8 is a chain mounted to travel upon two sprocket wheels 9, whose shafts 10 stand vertically and are journaled in bearings 11, in the table. On the upper edge of this chain are cross-bars 12, each bar being secured midway its length rigidly to one of the links of the chain, so that when the chain revolves these cross-bars travel around with it, whereby the chain is enabled to carry either empty buckets or buckets filled with fruit.

13 represents rails beneath the free ends of the cross bars, upon which the cross-bars may slide when heavily loaded, so that the chain serves merely to pull the cross-bars around sliding upon the rails. It would be impracticable to support the cross-bars and buckets set upon them a little out of balance as they usually would be when handled quickly in service upon the chain alone without using a very wide chain and causing much friction to support it. Both the top boards 5 and 6 slant a little outward so that any slop gathering thereon will have a tendency to run to the edge.

14 represents what may be termed spouts located beneath the top boards 5 and 6 and extending beneath their whole length and out beyond them crosswise so that all slop which runs from the outer edge of the table will be caught by these spouts, and their bottoms inclining inward will deliver the slop into the gathering trough 15. This trough is loop-shaped and located directly beneath the carrier chain all the way around, so that if the contents of any bucket should be slopped over in placing the bucket on or taking it off from the chain, or in being carried by the chain the gathering trough 15 would receive the said slop.

16 represents a discharge port for the trough, leading directly to another trough or invert 17 whereby the slop is carried away from the building.

18 represents one or more drags shaped to loosely fit within the trough and hung to the chain to be carried thereby in its rotations for the purpose of forcing along any portion of the slop which is not sufficiently fluid to run off by gravity, and as each drag passes over the port 16 the load in front of it will be discharged therefrom. Either one or both of the shafts 10 may be provided with pulleys to be rotated by belts in the usual manner. This table is supposed to be located between a scalding tub at one end and a can-filling machine at the other end, and the operatives whose duty it is to peel the tomatoes stand along both sides of the table.

The operation is as follows: First, buckets of scalded tomatoes are placed upon the chain whereby they are carried along the table and they are taken off the chain as fast as required by the operative and placed upon the top boards of the table, where the work of peeling is done. As fast as buckets are filled with peeled tomatoes they are placed upon the chain and carried thereby to the end of the table where an operative takes them off the chain and empties them into the can-filling machine, then he returns the empty bucket to the chain and it travels back to the scalding tub. Thus empty buckets, buckets of scalded tomatoes with the skins on, and buckets of peeled tomatoes will be left traveling round and around upon the chain until each is required by some operative, when it will be taken off for service as described. Frequent washing of the table and carrier chain with plenty of water is necessary, and the drip will pass from the table tops 5, 6 into the spouts 14, thence to the gathering trough 15, to be carried around by the drags 18 and discharged through the port 16 to the invert 17 which carries it away. It will thus be seen that this table is convenient for rapid work, because the empty buckets are constantly going back to the scalding tub to be refilled by the operative there, and full buckets are always traveling on the chain ready to be taken off as fast as required by the peelers, and the operators who empty the buckets may see at a glance which buckets contain the peeled tomatoes.

In all the operation no slop is permitted to reach the floor, but it is carried off through the table, and the table itself is adapted to be easily kept clean and sweet.

Having thus described my invention, what I believe to be new, and desire to secure by Letters Patent, is the following:

The combination of a loop-shaped table; vertical shafts journaled at the ends of the loop and horizontal wheels fixed upon the shafts below the plane of the table; a chain mounted to travel around the wheels; cross bars fixed upon the chain at the plane of the table within its loop and less than the width of a bucket apart, and rails fixed beneath the ends of the cross-bars throughout their path, substantially as described.

In testimony whereof I affix my signature in presence of two witnesses.

FRANK M. ANDERSON.

Witnesses:
W. L. McNAMARA,
PETER KELLY.